United States Patent [19]

North

[11] 4,100,162
[45] Jul. 11, 1978

[54] PROCESS FOR PREPARING GAMMA QUINACRIDONE FROM POLYPHOSPHORIC ACID AND ALCOHOL

[75] Inventor: Robert Jarl North, Elmwood Park, N.J.

[73] Assignee: Harmon Colors, New York, N.Y.

[21] Appl. No.: 759,692

[22] Filed: Jan. 17, 1977

Related U.S. Application Data

[63] Continuation-in-part of Ser. No. 643,445, Dec. 22, 1975, abandoned, which is a continuation-in-part of Ser. No. 518,557, Oct. 29, 1974, abandoned.

[51] Int. Cl.$^2$ .............................................. C09B 48/00
[52] U.S. Cl. ........................ 260/279 QA; 106/288 Q
[58] Field of Search ............. 260/279 QA; 106/288 Q

[56] References Cited

U.S. PATENT DOCUMENTS

| 3,257,405 | 6/1966 | Gerson et al. | 260/279 QA |
| 3,265,699 | 8/1966 | Jaffe | 260/279 QA |

FOREIGN PATENT DOCUMENTS

72/17,149  5/1972  Japan.

*Primary Examiner*—Donald G. Daus
*Assistant Examiner*—Diana G. Rivers
*Attorney, Agent, or Firm*—Plumley and Tyner

[57] ABSTRACT

A method is provided for the direct production of gamma quinacridone pigment comprising ring closure of 2,5-dianilinoterephthalic acid in polyphosphoric acid and diluting the mixture by addition thereof into a water-miscible alcohol containing 1–3 carbon atoms, e.g. methanol, while maintaining the temperature of the alcohol-acid at between 0° and 25° C.

5 Claims, No Drawings

PROCESS FOR PREPARING GAMMA QUINACRIDONE FROM POLYPHOSPHORIC ACID AND ALCOHOL

BACKGROUND OF THE INVENTION

This Application is a continuation-in-part of copending application Ser. No. 643,445, filed Dec. 22, 1975 now abandoned, which is a continuation-in-part of Ser. No. 518,557 filed Oct. 29, 1974, now abandoned.

This invention relates to quinacridone pigments. More particularly this invention relates to a process for producing the gamma crystalline phase of quinacridone (hereinafter termed gamma quinacridone).

Linear quinacridone is represented by the structure

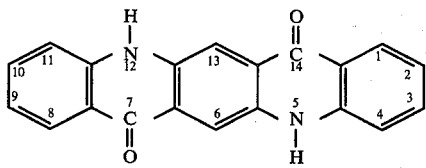

and, as is disclosed in U.S. Pat. No. 2,844,581, exists in a number of crystalline phases, including the alpha phase, the beta phase and the gamma phase.

Recently, gamma quinacridone has found a ready market in the automotive and architectural industries in view of the fact that this pigment products a deep red metallic finish in the quinacridone color region. Heretofore, gamma quinacridone pigment has geen commercially produced by milling quinacridone prepared by the oxidation of dihydroquinacridone. Note U.S. Pat. No. 2,844,581. Other patents in this same general area are U.S. Pat. Nos. 3,160,510, 3,257,405, 3,265,699, 3,342,823, 3,362,957 and 3,547,925. The milling of quinacridone to produce the gamma quinacridone pigment is, of course, an additional step in the production of the pigment and requires additional energy input, time, equipment, etc.

It is an object of this invention to produce gamma quinacridone. It is a further object of this invention to produce gamma quinacridone directly from the ring closure of 2,5-dianilinoterephthalic acid. These and other objects will become apparent from the description which follows.

SUMMARY OF THE INVENTION

In accordance with this invention there is provided a process for producing gamma quinacridone pigment which comprises heating, at above about 70° C., 2,5-dianilinoterephthalic acid in the presence of polyphosphoric acid and thereafter cooling the mixture to below 25° C. and diluting the mixture by addition thereof to a water-miscible alcohol containing 1-3 carbon atoms, e.g. methanol, at a rate such that the temperature does not rise above 25° C.

When operating in accordance with the present invention, i.e., the ring closure of 2,5-dianilinoterephthalic acid followed by dilution of the reaction mixture into an alcohol under controlled temperature conditions, it has been found that the product produced is essentially pure gamma quinacridone pigment, i.e., exhibits an X-ray diffraction pattern consistent with that generally recognized as identifying the gamma crystalline form of quinacridone. Thus, the process of the present invention provides a process for the direct production of gamma quinacridone pigment and eliminates the need for the extra milling step which has theretofore been used for the production of this crystalline phase of the quinacridone pigment.

DETAILED DESCRIPTION OF THE INVENTION

The gamma quinacridone pigments produced by the process of the present invention have excellent outdoor durability and are useful in coloring automotive finishes, inks and house paints. They are particularly valuable in preparing finishes and transparent automotive metallic finishes.

The process of the present invention provides a simple economic route to gamma quinacridone which eliminates the need for certain operations heretofore thought necessary for the production of this crystalline phase of quinacridone. Furthermore, it is quite unexpected that the process of the present invention would produce gamma quinacridone inasmuch as present quinacridone technology would ordinarily predict that drowning of polyphosphoric acid solution of quinacridone into an alcohol would produce the violet, beta phase type of quinacridone. It has been found that this is not the case and that by operating within the confines of the present invention the quinacridone produced exhibits a pure gamma type of X-ray pattern.

In carrying out the process for the present invention, the 2,5-dianilinoterephthalic acid is dissolved in polyphosphoric acid. The use of polyphosphoric acid as a ring closing agent is well known in the quinacridone art as exemplified by U.S. Pat. Nos. 3,257,405 and 3,342,823. As indicated in that prior art, the polyphosphoric acid should have an acid content ($H_3PO_4$) of at least 100 percent. Preferably, the polyphosphoric acid strength is between 114–120 percent. The mixture is heated while being stirred at a temperature of above 70° C., preferably between 80° and 120° C. After the ring closure has been accomplished, which usually takes from 4-16 hours, the mixture is added to alcohol which is maintained at a temperature of between 0° and 25° C., the rate of addition being such that the temperature does not rise above 25° C. Thus, for faster addition, the amount of external cooling will be greater. The amount of alcohol necessary is, of course, dependent on the volume of the mixture. Enough alcohol must be used which is sufficient to dissolve all the phosphoric acid. Preferably excess alcohol is present to facilitate agitation of the mixture. After stirring the mixture at below 25° C. for a time sufficient to dissolve the acid mixture, the total mixture is then heated to reflux, drowned into water, filtered, washed alkali free and dried to yield the essentially pure, red, solid, gamma phase quinacridone pigment.

The addition of the polyphosphoric acid solution to the alcohol, rather than vice versa, is critical to the process of this invention, as in maintaining the temperature below 25° C. While it is possible to obtain gamma quinacridone by the time-regulated addition of alcohol to the polyphosphoric acid solution, the results of such a process are not easily reproducible and very often large amounts of beta quinacridone are produced with the gamma quinacridone. In following the order of addition of the process of this invention, only gamma quinacridone is produced. Whether the acid solution is added over a period of three minutes or thirty minutes, the same results are obtained as long as the temperature is maintained within the critical range.

The alcohols useful in the process of the present invention are water-miscible alcohols containing 1 to 3 carbon atoms. The alcohols can contain one, two or three hydroxy groups, and representative examples are methanol, ethanol, propanol, isopropanol, ethylene glycol, 1,2-propylene glycol, 1,3-propane diol and glycerol. Alcohols that contain more than three carbon atoms, or are water-immiscible, tend to initiate the formation of betaquinacridone such that mixtures of beta and gamma quinacridone are obtained, as opposed to essentially pure gamma quinacridone. Methanol is a preferred embodiment due to its ready availability, ease of handling and low cost.

As has been indicated above, the temperature of the alcohol and the alcohol-acid mixture, during the drowning step, must be between 0° and 25° C., preferably 0° to 15° C. If the temperature is not controlled, it will rise, due to the higher temperature of the polyphosphoric acid mixture, above 25° C. and beta phase quinacridone will result. The 0° C. lower limit is selected for convenience since it is most economical to keep the alcohol temperature low by means of an ice bath.

DESCRIPTION OF PREFERRED EMBODIMENT

The following examples are given by way of illustration only; all parts are by weight unless otherwise indicated.

EXAMPLE I

To 130 parts of 118 percent polyphosphoric acid (118 percent $H_3PO_4$) are added 18 parts of 2,5-dianilinoterephthalic acid and the mixture is heated at 102° to 106° C. for 16 hours. The resulting thick solution is cooled to 90° C. and poured into 250 parts of methanol over a period of 5 minutes at a rate such that the temperature of the methanol is not allowed to exceed 15° C. The methanol is maintained at between 0° and 15° C. by means of an ice bath. After addition is complete, the mixture is stirred for 15 minutes at 15° C. or below and then heated to reflux for 1½ hours. After allowing the mixture to cool to about 90° C it is drowned into 400 parts of water at 20° C., heated at 60° C. and boiled for ½ hour. The solid is filtered, washed acid free, reslurried with 1000 parts of water and boiled with 50 parts of 50 percent NaOH for 1 hour. The solid is again filtered, washed acid free and dried at 180° F. to yield 15 parts of pure pigmentary gamma quinacridone.

Example II

The procedure of Example I was repeated with the exception that the ice bath was removed. Addition of the acid solution to the methanol caused the temperature of the methanol to rise to reflux. The product recovered was the violet, beta phase quinacridone containing only minor amounts of gamma quinacridone.

What is claimed is:

1. A process for the direct production of gamma quinacridone pigment which comprises heating, at a temperature between 80° and 120° C. 2,5-dianilinoterephthalic acid in polyphosphoric acid, diluting the reaction mixture by addition thereof to a water-miscible alcohol containing 1 to 3 carbon atoms in an amount sufficient to dissolve the polyphosphoric acid while maintaining the temperature of the alcohol between about 0° and 25° C. during said addition, and thereafter separating gamma quinacridone from the resulting mixture.

2. A process as defined in claim 1 wherein the polyphosphoric acid has an acid content of at least 100 percent.

3. A process as defined in claim 1 wherein the alcohol is methanol.

4. A process as defined in claim 1 wherein the temperature of the alcohol is maintained at between about 15° and 0° C.

5. A process as defined in claim 4 wherein the temperature of the methanol is maintained between about 15° and 0° C.

* * * * *